US010782922B2

(12) United States Patent
Gibes et al.

(10) Patent No.: US 10,782,922 B2
(45) Date of Patent: *Sep. 22, 2020

(54) STORAGE DEVICE VOLUME SELECTION FOR IMPROVED SPACE ALLOCATION

(71) Applicant: International Business Machines Corporation, Armonk, NY (US)

(72) Inventors: Kenneth J. Gibes, Tucson, AZ (US); Harold S. Huber, Scottsdale, AZ (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/249,830

(22) Filed: Jan. 16, 2019

(65) Prior Publication Data

US 2019/0146677 A1    May 16, 2019

Related U.S. Application Data

(63) Continuation of application No. 15/134,222, filed on Apr. 20, 2016, now Pat. No. 10,228,886.

(51) Int. Cl.
*G06F 3/06* (2006.01)

(52) U.S. Cl.
CPC ............ *G06F 3/067* (2013.01); *G06F 3/0605* (2013.01); *G06F 3/0631* (2013.01); *G06F 3/0644* (2013.01); *G06F 3/0685* (2013.01); *G06F 3/0608* (2013.01); *G06F 3/0653* (2013.01); *G06F 3/0683* (2013.01); *G06F 2212/7207* (2013.01)

(58) Field of Classification Search
CPC .... G06F 3/0653; G06F 3/0608; G06F 3/0683; G06F 2212/7207
See application file for complete search history.

(56) References Cited

U.S. PATENT DOCUMENTS 6,636,879 B1   10/2003   Doucette et al.
7,028,041 B2   4/2006    L'Heureux
(Continued)

FOREIGN PATENT DOCUMENTS

WO    2015095851 A1    6/2015

OTHER PUBLICATIONS

List of IBM Patents or Patent Applications Treated As Related.
(Continued)

*Primary Examiner* — Masud K Khan
(74) *Attorney, Agent, or Firm* — Zilka-Kotab, P.C.

(57) ABSTRACT

A computer program product, according to one embodiment, includes a computer readable storage medium having program instructions embodied therewith, the program instructions executable by a computer to cause the computer to: receive, by the computer, a data set allocation request; determine, by the computer, whether a size of the data set is greater than a threshold; use, by the computer, first key values in a first index to select a volume in response to determining that the size of the data set is greater than the threshold; use, by the computer, second key values in a second index to select a volume in response to determining that the size of the data set is less than the threshold; perform, by the computer, the allocation request in the selected volume; and store, by the computer, control data about the data set in the control data set corresponding to the selected volume.

20 Claims, 5 Drawing Sheets

(56) References Cited

U.S. PATENT DOCUMENTS

| | | |
|---|---|---|
| 7,146,475 B2 | 12/2006 | Perego |
| 8,521,986 B2 | 8/2013 | Beckmann et al. |
| 8,775,766 B2 | 7/2014 | LeGendre et al. |
| 10,228,886 B2 | 3/2019 | Gibes et al. |
| 2003/0046294 A1 | 3/2003 | Heronimus |
| 2007/0113157 A1 | 5/2007 | Perego |
| 2007/0239957 A1 | 10/2007 | Lin |
| 2012/0198105 A1 | 8/2012 | McKean et al. |
| 2012/0303918 A1 | 11/2012 | Reed et al. |
| 2012/0324176 A1 | 12/2012 | Bohling et al. |
| 2017/0308322 A1 | 10/2017 | Gibes et al. |

OTHER PUBLICATIONS

Meehan, T. J., "An Introduction to FDRMOVE with FDRPAS," Innovation Data Processing, Session No. 3069, Feb. 27, 2008, pp. 1-28.

Martinez, J. L. C., "Using Data Sets," Introducción al Sistemas Operativo z/OS, pp. 1-17.

Wente, D., "Why Modernize IMS Database Performance? Auto Discovery, Work Avoidance, Effectiveness," BMC Software, May 2, 2012, pp. 1-46.

"FDREPORT: Concepts & Facilities Guide," Innovation Data Processing, Jul. 2010, pp. 1-60.

Gibes et al., U.S. Appl. No. 15/134,222, filed Apr. 20, 2016.

Non-Final Office Action from U.S. Appl. No. 15/134,222, dated Aug. 9, 2017.

Non-Final Office Action from U.S. Appl. No. 15/134,222, dated Feb. 7, 2018.

Final Office Action from U.S. Appl. No. 15/134,222, dated Aug. 23, 2018.

Notice of Allowance from U.S. Appl. No. 15/134,222, dated Oct. 31, 2018.

STORAGE DEVICE VOLUME SELECTION FOR IMPROVED SPACE ALLOCATION

BACKGROUND

The present invention relates to data storage, and more specifically, this invention relates to selecting a data storage location to achieve improved space allocation.

When selecting a volume with which to perform a data set allocation, previous implementations have selected the volume having the most available free space. However, by continually performing data set allocations at the volume that has the most available free space, this has led to allocation failures resulting from the control data structure being filled to capacity while free space still exists in the volume. If the control data structure is full, no additional data sets can be allocated on the volumes associated therewith, thereby reducing data storage efficiency. Moreover, in some cases, existing data sets cannot extend on those same volumes. In turn, this additionally results in extra overhead during the allocation process, because the volumes having filled control data structures are examined during subsequent allocation requests despite being unavailable.

SUMMARY

A computer program product, according to one embodiment, includes a computer readable storage medium having program instructions embodied therewith, the program instructions executable by a computer to cause the computer to: receive, by the computer, a data set allocation request; determine, by the computer, whether a size of the data set is greater than a threshold; use, by the computer, first key values in a first index to select a volume in response to determining that the size of the data set is greater than the threshold; use, by the computer, second key values in a second index to select a volume in response to determining that the size of the data set is less than the threshold; perform, by the computer, the allocation request in the selected volume; and store, by the computer, control data about the data set in the control data set corresponding to the selected volume.

A computer-implemented method, according to another embodiment, includes: receiving a data set allocation request; determining whether a size of the data set is greater than a threshold; using first key values in a first index to select a volume in response to determining that the size of the data set is greater than the threshold; using second key values in a second index to select a volume in response to determining that the size of the data set is less than the threshold; performing the allocation request in the selected volume; and storing control data about the data set in the control data set corresponding to the selected volume.

A system, according to yet another embodiment, includes: a processor and logic integrated with and/or executable by the processor, the logic being configured to: collect information which includes an amount of free space in each of more than one volumes, an amount of free space in each of more than one control data sets which correspond to the volumes, and a fragmentation level in each of the volumes; and use the collected information to generate a first key value and a second key value for each of the volumes and corresponding control data sets. The first key value is determined for a given volume and corresponding control data set by assigning a weight of greater than 50% to the amount of free space in the volume, and a weight of less than 50% to the amount of free space in the control data set. The second key value is determined for a given volume and corresponding control data set by assigning a weight of less than 50% to the amount of free space in the volume, and a weight of greater than 50% to the amount of free space in the control data set. A greater amount of free space in the volume and a lesser amount of free space in the control data set correspond to a higher first key value, and a lesser amount of free space in the volume and a greater amount of free space in the control data set correspond to a higher second key value; The logic is also configured to: use the first key values to index the volumes and corresponding control data sets in a first index; use the second key values to index the volumes and corresponding control data sets in a second index; receive a data set allocation request; determine whether a size of the data set is greater than a threshold; use the first key values in the first index to select a volume in response to determining that the size of the data set is greater than the threshold; use the second key values in the second index to select a volume in response to determining that the size of the data set is less than the threshold; perform the allocation request in the selected volume; cause storage of control data about the data set in the control data set corresponding to the selected volume; and update the key values of the selected volume and corresponding control data set used to perform the allocation request.

Other aspects and embodiments of the present invention will become apparent from the following detailed description, which, when taken in conjunction with the drawings, illustrate by way of example the principles of the invention.

DETAILED DESCRIPTION

Figure 1:
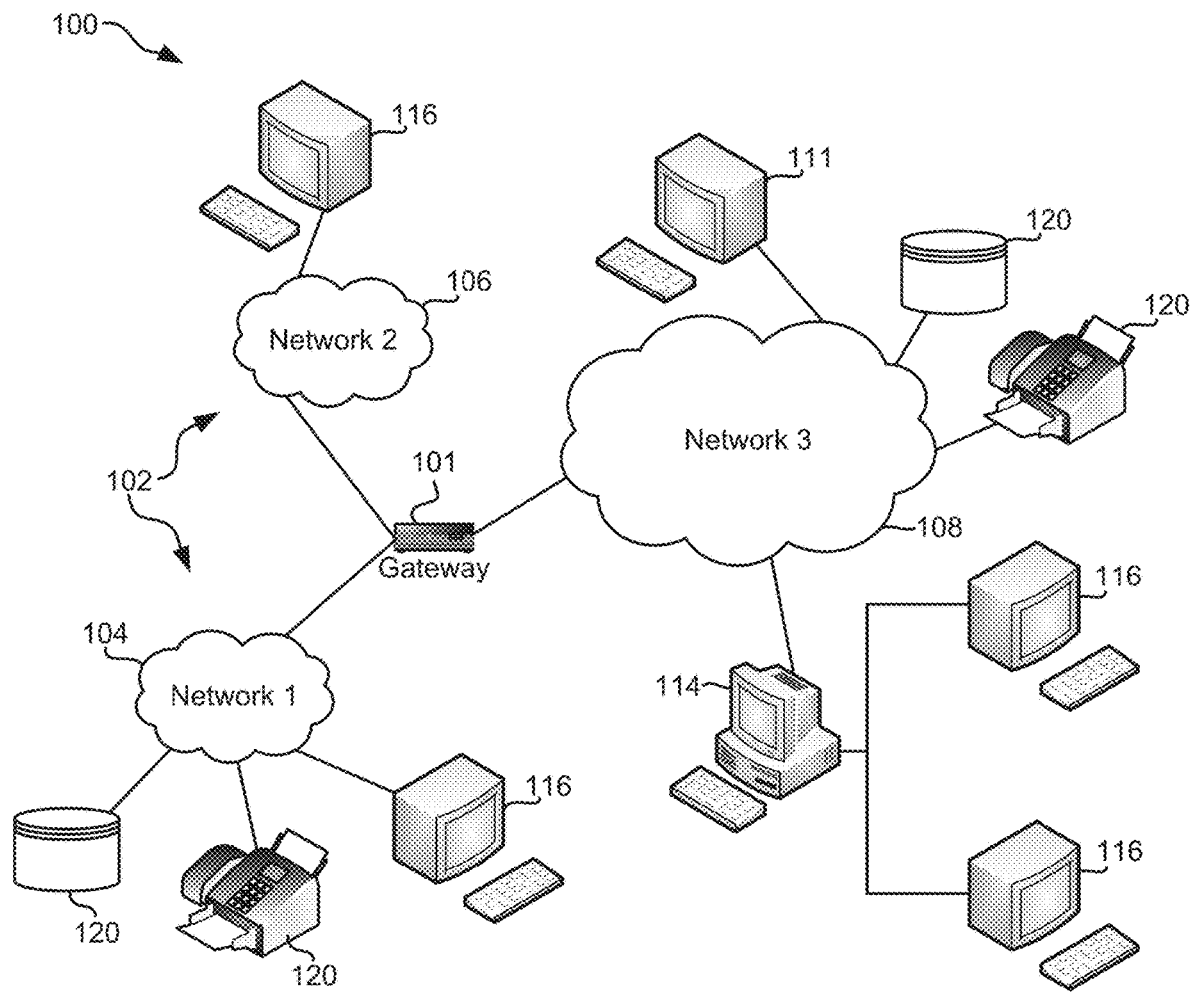
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for selecting data set allocation based on volume characteristics rather than simply the total amount of free space in each volume. By evaluating information pertaining to the different locations at which data may be allocated, some of the embodiments described herein are able to improve the use of storage. Moreover, in doing so, various embodiments described herein desirably improve efficiency of storage use, increase data storage density, reduce the number of allocation failures, reduce the amount of available yet unusable data storage space, etc., as will be described in further detail below.

In one general embodiment, a computer program product includes a computer readable storage medium having program instructions embodied therewith, the program instructions executable by a computer to cause the computer to: receive, by the computer, a data set allocation request, determine, by the computer, whether a size of the data set is greater than a threshold, use, by the computer, first key values in a first index to select a volume in response to determining that the size of the data set is greater than the threshold, use, by the computer, second key values in a second index to select a volume in response to determining that the size of the data set is less than the threshold, perform, by the computer, the allocation request in the selected volume, and store, by the computer, control data about the data set in the control data set corresponding to the selected volume.

In another general embodiment, a computer-implemented method includes: receiving a data set allocation request, determining whether a size of the data set is greater than a threshold, using first key values in a first index to select a volume in response to determining that the size of the data set is greater than the threshold, using second key values in a second index to select a volume in response to determining that the size of the data set is less than the threshold, performing the allocation request in the selected volume, and storing control data about the data set in the control data set corresponding to the selected volume.

In yet another general embodiment, A system, according to yet another embodiment, includes: a processor and logic integrated with and/or executable by the processor, the logic being configured to: collect information which includes an amount of free space in each of more than one volumes, an amount of free space in each of more than one control data sets which correspond to the volumes, and a fragmentation level in each of the volumes; and use the collected information to generate a first key value and a second key value for each of the volumes and corresponding control data sets. The first key value is determined for a given volume and corresponding control data set by assigning a weight of greater than 50% to the amount of free space in the volume, and a weight of less than 50% to the amount of free space in the control data set. The second key value is determined for a given volume and corresponding control data set by assigning a weight of less than 50% to the amount of free space in the volume, and a weight of greater than 50% to the amount of free space in the control data set. A greater amount of free space in the volume and a lesser amount of free space in the control data set correspond to a higher first key value, and a lesser amount of free space in the volume and a greater amount of free space in the control data set correspond to a higher second key value; The logic is also configured to: use the first key values to index the volumes and corresponding control data sets in a first index; use the second key values to index the volumes and corresponding control data sets in a second index; receive a data set allocation request; determine whether a size of the data set is greater than a threshold; use the first key values in the first index to select a volume in response to determining that the size of the data set is greater than the threshold; use the second key values in the second index to select a volume in response to determining that the size of the data set is less than the threshold; perform the allocation request in the selected volume; cause storage of control data about the data set in the control data set corresponding to the selected volume; and update the key values of the selected volume and corresponding control data set used to perform the allocation request.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
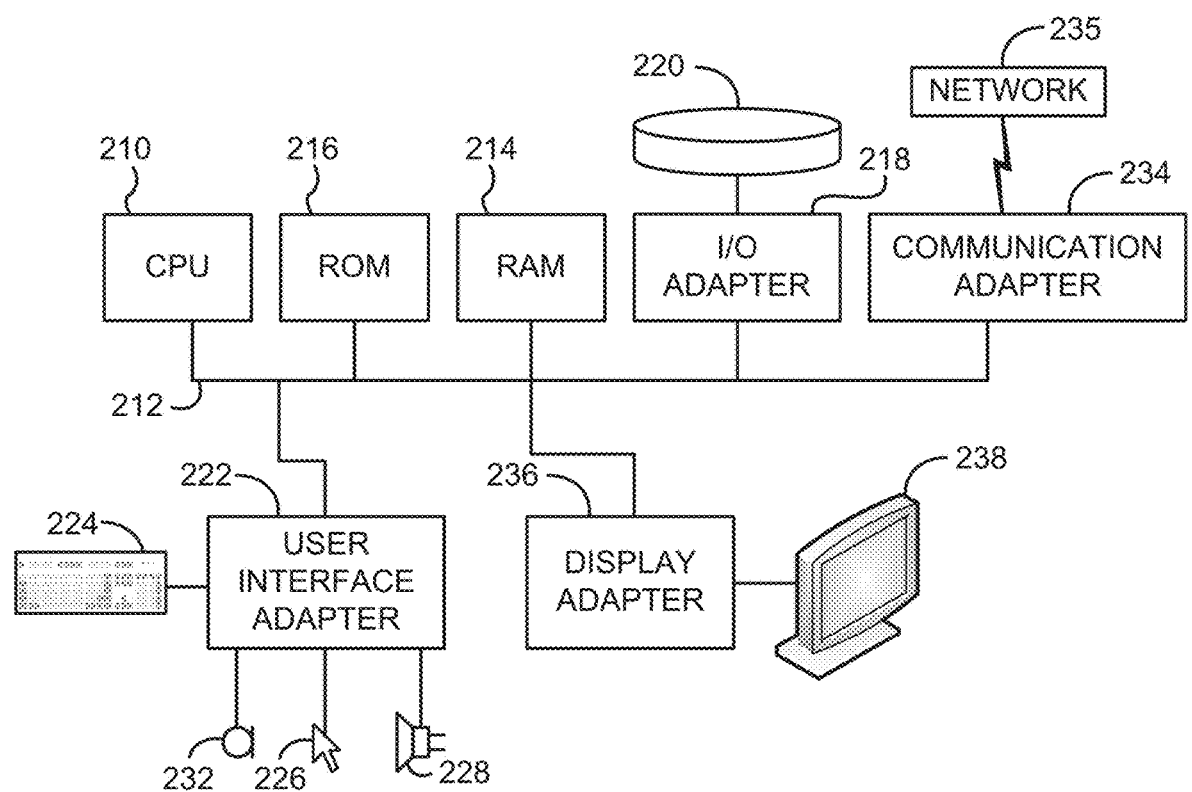
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
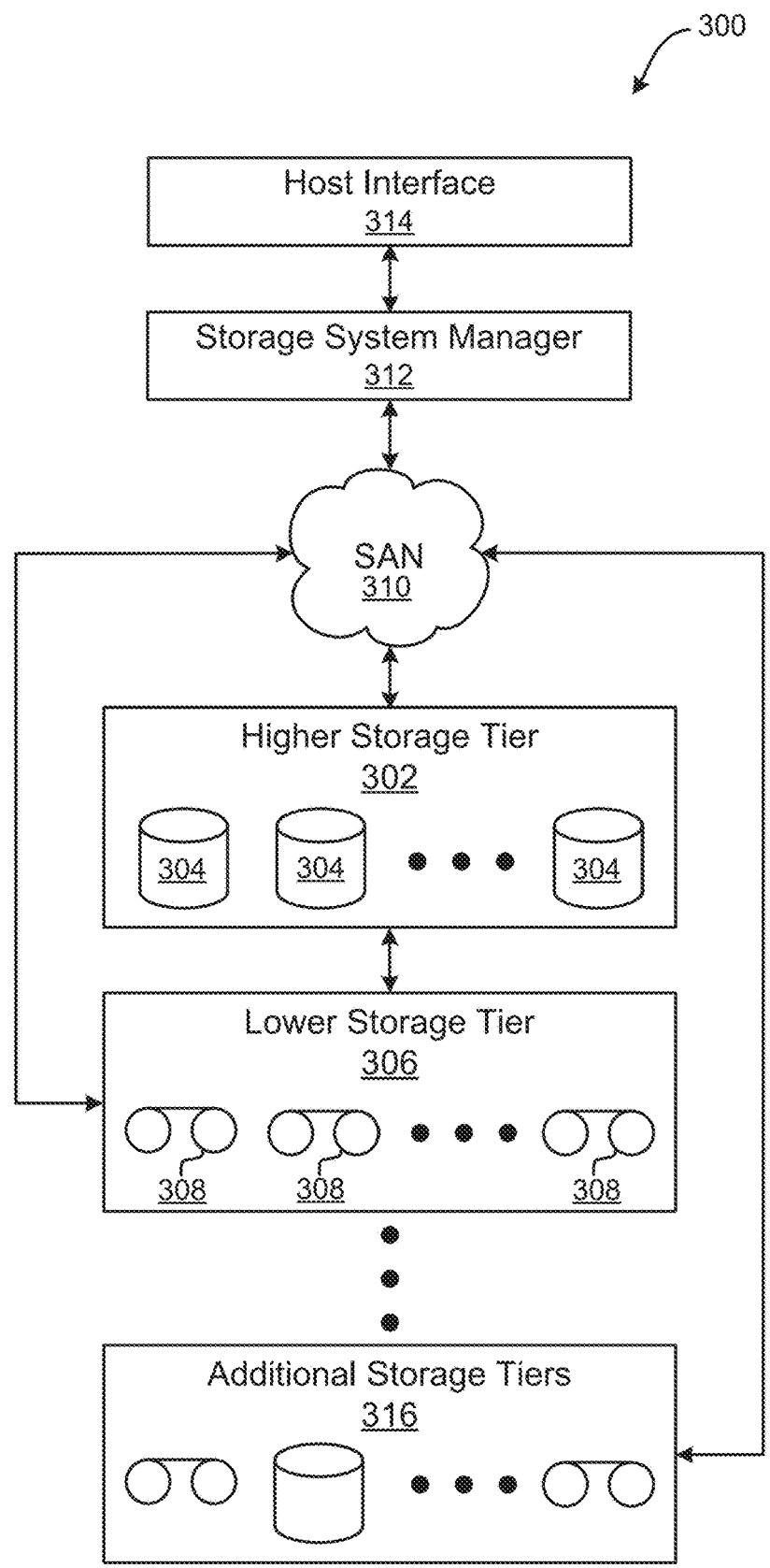
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As would be appreciated by one skilled in the art, one or more physical memory media (e.g., one or more tape media, HDDs, SSDs) of a storage system may be represented by one or more virtual volumes. Moreover, data allocations may be performed by selecting a virtual volume having unused memory therein and storing data associated with the allocation in the selected virtual volume. A record of what data is stored on a particular virtual volume is preferably maintained. Thus, in some approaches, a control data structure may be used to keep track of the data that is stored in a virtual volume.

Certain factors may be taken into consideration when selecting a physical location to perform a data allocation. As previously mentioned, when selecting a volume to which to allocate a data set, previous implementations have selected the volume having the most available free space. However, by continually performing data set allocations at the volume that has the most available free space, this has led to allocation failures resulting from the control data structure being filled to capacity while free space still exists in the volume. If the control data structure is full, no additional data sets can be allocated on the volumes associated therewith, thereby reducing data storage efficiency.

Moreover, in some cases, existing data sets cannot be extended on those same volumes. This in turn results in extra overhead during the allocation process, because the volumes having filled control data structures are examined during subsequent allocation requests despite being unavailable. It follows that merely selecting the volume with the highest amount of free space to perform data set allocations sometimes produces undesirable results, particularly when the data set being allocated is a small data set, which tends to use a proportionally large contiguous extent of the control data structure relative to the smaller amount of data being stored in the volume.

In sharp contrast, various embodiments described herein include allocation processes that are able to overcome the inefficient use of data storage experienced in previous implementations. Some embodiments are able to achieve a more advanced allocation process which desirably reduces the chances of having unused space in storage volumes by more optimally allocating the data sets across the available storage locations. According to some approaches, the aforementioned improvements may be achieved by taking into account the size of the data set, an amount of free space in the volume control data sets, and/or the overall amount of free space on the volume, as will be described in further detail below.

Figure 4A:
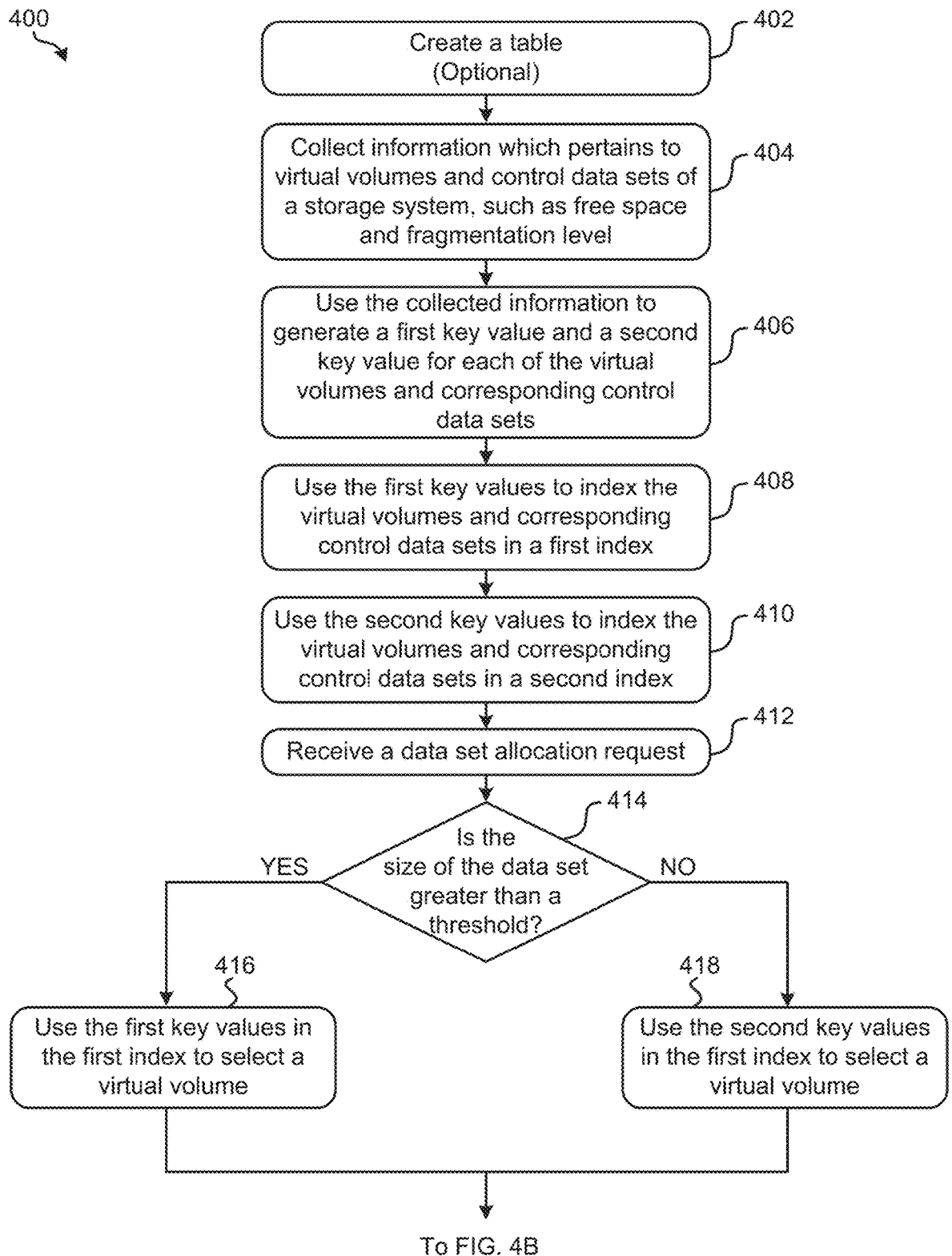
FIGS. 4A-4B depict a flowchart of a method in accordance with one embodiment.
Figure 4B:
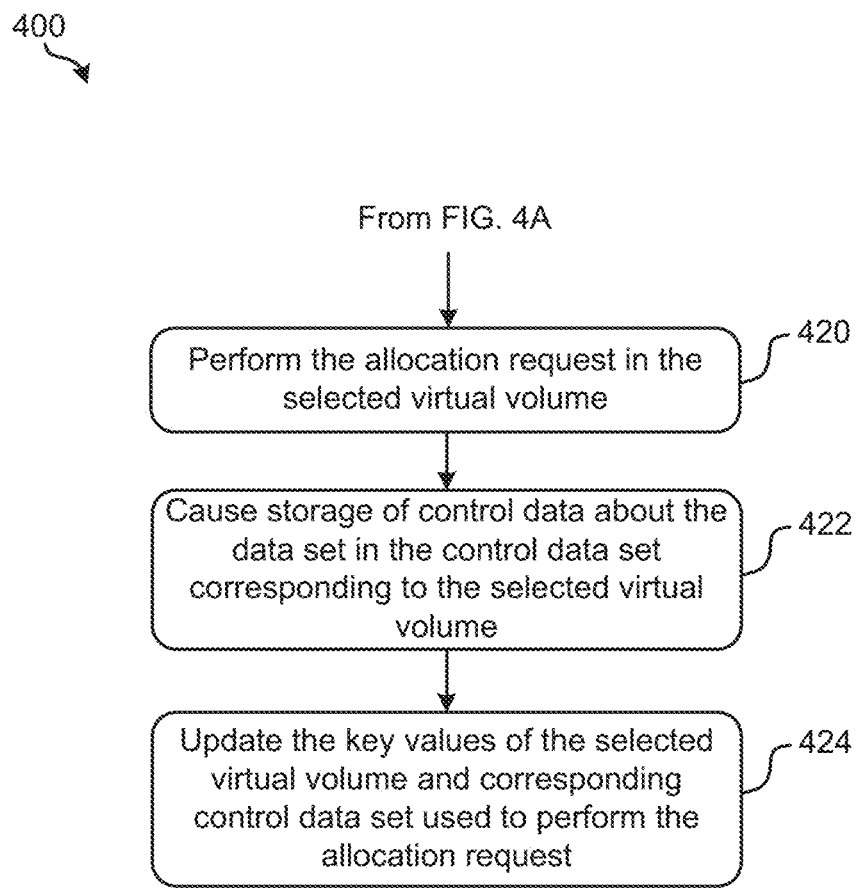

Now referring to FIGS. 4A-4B, a flowchart of a method 400 is shown according to one embodiment. The method 400 may be performed in accordance with the present invention in any of the environments depicted in FIGS. 1-3, among others, in various embodiments. Of course, more or less operations than those specifically described in FIGS. 4A-4B may be included in method 400, as would be understood by one of skill in the art upon reading the present descriptions.

Each of the steps of the method 400 may be performed by any suitable component of the operating environment. For example, in various embodiments, the method 400 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), a computer, etc., combinations thereof, or any other suitable computing device known in the art.

As shown in FIG. 4A, method 400 includes an optional operation 402, which includes creating or acquiring a table that is usable in the context of method 400. According to an exemplary approach, which is in no way intended to limit the invention, the table may be created in a virtual storage access method (VSAM) keyed data set, as would be appreciated by one skilled in the art upon reading the present description.

Operation 404 includes collecting information which pertains to a storage system in which data allocations may be performed. In various approaches, the information collected may include an amount of free space in each of more than one virtual volumes, an amount of free space in each of more than one control data sets which correspond to the virtual volumes, an amount of additional free space that may be obtained if the control data set is extended on the existing volume, a fragmentation level in each of the virtual volumes, etc., or any other additional statistical volume information desired. According to an exemplary approach, which is in no way intended to limit the invention, the information may be collected from a macro call, which may be used to determine how much space is available on each of the virtual volumes, and the characteristics of the corresponding control data sets. In one example, a macro call similar to an IBM z/OS LSPACE macro call may be used. LSPACE provides information on volume size, free space on the volume, free space on the VTOC and INDEX, volume fragmentation, and VTOC status. Also provided is information on the size of the track-managed space and its free space statistics. The LSPACE macro returns status information (such as LSPACE subfunction, return code, and reason code) in the parameter list.

Although the information may be collected each time an allocation request is received, in different approaches the information may be collected periodically, e.g., after an amount of time has passed; after a predetermined condition has been met, e.g., after a given number of allocation requests have been performed; upon user request; upon occurrence of some other type of trigger event; etc. The frequency at which the information is collected may be adjusted based on the amount of available processing bandwidth, however it is preferred that information pertaining to the storage system is collected as frequently as possible, e.g., to ensure the information being used to perform allocation requests is an accurate representation of the virtual volumes and control data sets.

The collected information is preferably stored for future use. According to some embodiments, the collected information may be used to perform data set allocation requests. Moreover, the collected information may be used differently depending on the size of the data set being allocated, e.g., as will be further described below with reference to operations 416, 418. If optional operation 402 is performed, the collected information may be stored in the created table. However, in other approaches, the collected information may be stored in a different manner, e.g., in an existing table.

Moreover, looking to operation 406, the collected information is used to generate a first key value and a second key value for each of the virtual volumes and corresponding control data sets, respectively. An exemplary list of control data sets which may be implemented includes, but is not limited to, a volume table of contents (VTOC), a volume table of contents index (VTOCIX), a virtual storage access method (VSAM) volume data set (VVDS), etc., or any other type of control data set which would be apparent to one skilled in the art upon reading the present description. According to some approaches, the control data set may map to data is stored in a given volume. In other approaches, the control data set may include additional information, e.g., such as attributes of the data sets which are stored in a given location.

The first and second key values are preferably generated to represent a relative hierarchy for the virtual volumes, which denotes a preferred order in which the virtual volumes are used to perform different data allocations. As previously mentioned, allocating data sets of different sizes (e.g., amounts of data) may have different effects on a given volume. For example, a large data set allocated to a virtual volume tends to use a large amount of the available space in the virtual volume in comparison to the amount of available space used in the control data set. Thus, a greater amount of free space in a virtual volume and a lesser amount of free space in the associated control data set may correspond to a first key value which denotes that using the virtual volume and control data set to perform a large data set allocation is more desirable (e.g., a higher first key value).

According to another example, a smaller data set allocated to a virtual volume may use a large amount of the available space in the control data set relative to the larger amount of available space used in the virtual volume. It follows that a lesser amount of free space in the volume and a greater amount of free space in the control data set may correspond to a second key value which denotes that using the virtual volume and control data set to perform a small data set allocation is more desirable (e.g., a higher second key value), at least in comparison to another virtual volume having a greater amount of free space and/or a corresponding control data set having a lesser amount of free space.

Thus, the first key values are preferably generated such that the first key value corresponding to each of the virtual volumes represents a relative desirability that a particular virtual volume is used to perform an allocation of a large data set. Similarly, the second key values are preferably generated such that they provide a relative desirability that a particular virtual volume is used to perform an allocation of a small data set. These key values may later be used to select a virtual volume to which a data set will be allocated, as described in more detail below with reference to operations 414-418.

According to some approaches, the amount of free space in the virtual volume may be weighted more heavily in determining the first key value for the virtual volume than the amount of free space in the control data set. In other words, the amount of free space in the virtual volume may have more of an effect on the desirability that a particular volume is used to perform a data set allocation for large data sets than the amount of free space in the control data set corresponding to the virtual volume.

According to an exemplary embodiment, which is in no way intended to limit the invention, the first key value may be determined for a given virtual volume and corresponding control data set by assigning a weight of greater than 50% to the amount of free space in the virtual volume, and a weight of less than 50% to the amount of free space in the control data set. More preferably, the first key value may be determined for a given virtual volume and corresponding control data set according to some approaches by assigning a weight of greater than 65% to the amount of free space in the virtual volume, and a weight of less than 35% to the amount of free space in the control data set. Still more preferably, the first key value may be determined for a given virtual volume and corresponding control data set according to other approaches by assigning a weight of greater than 75% to the amount of free space in the virtual volume, and a weight of less than 25% to the amount of free space in the control data set, but could be higher or lower depending on the situation, user preference, etc. In some approaches, which are in no way intended to limit the invention, the amount of free space in the control data set may only be considered as a secondary factor. For example, the amount of free space in a control data set may only be considered to determine whether an allocation may be successfully performed.

Moreover, the amount of free space in the control data set may be weighted more heavily in determining the second key value for the virtual volume than the amount of free space in the virtual volume. Thus, the amount of free space in the control data set corresponding to a virtual volume may have more of an effect on the desirability that a particular volume is used to perform a data set allocation for small data sets than the amount of free space in the virtual volume.

According to another exemplary embodiment, which again is in no way intended to limit the invention, the second key value may be determined for a given virtual volume and corresponding control data set by assigning a weight of less than 50% to the amount of free space in the virtual volume, and a weight of greater than 50% to the amount of free space in the control data set and/or the fragmentation level of the virtual volume. More preferably, the second key value may be determined for a given virtual volume and corresponding control data set according to some approaches by assigning a weight of less than 35% to the amount of free space in the virtual volume, and a weight of greater than 65% to the amount of free space in the control data set and/or the fragmentation level of the virtual volume. Still more preferably, the second key value may be determined for a given virtual volume and corresponding control data set according to other approaches by assigning a weight of less than 25% to the amount of free space in the virtual volume, and a weight of greater than 75% to the amount of free space in the control data set and/or the fragmentation level of the virtual volume, but could be higher or lower. It should also be noted that the size of the control data set may be expanded in some instances (e.g., for a VTOC in some situations), as would be appreciated by one skilled in the art upon reading the present description. However, it is preferred that expanding the control data set is avoided, e.g., to prevent additional consumption of additional resources.

It follows that the first and second key values incorporate more information (e.g., volume characteristics) when determining where a data set allocation should be performed than simply selecting the location having the greatest amount of free space, thereby improving the data set allocation process, as will be discussed in further detail below.

Referring still to method 400, operation 408 includes using the first key values to index the virtual volumes and corresponding control data sets in a first index. As mentioned above, the first key value corresponding to each of the virtual volumes preferably provides a relative desirability that a particular virtual volume is used to perform an allocation of a large data set. Thus, the first index may provide a preferred order in which the various virtual volumes may be used to perform an allocation of a large data set based on information corresponding to the status of the virtual volumes and/or corresponding control data sets, e.g., as gathered in operation 404.

Moreover, operation 410 includes using the second key values to index the virtual volumes and corresponding control data sets in a second index. Again, as mentioned above, the second key value corresponding to each of the virtual volumes preferably indicates a relative desirability of using each of the virtual volumes to perform an allocation of a small data set. Thus, the second index may provide a preferred order in which the various virtual volumes may be used to perform an allocation of a small data set based on information which corresponds to the status of the virtual volumes and/or corresponding control data sets, e.g., as gathered in operation 404. It follows that the first index may include the virtual volumes and control data sets in a different order than the second index. However, in some approaches, the first and second indexes may include the virtual volumes and control data sets in the same (or about the same) order, e.g., when each of the virtual volumes and control data sets have about the same amount of free space, when the storage system has a small number of virtual volumes and control data sets, etc.

According to an exemplary embodiment, which is in no way intended to limit the invention, a virtual volume having a high number of small data sets allocated thereto may have a higher amount of free space therein compared to the amount of free space in the corresponding control data set. As previously mentioned, information pertaining to each entry made to a virtual volume is stored in the control data set which corresponds to the virtual volume. As a result, a plurality of small data sets may accumulatively use less of the overall amount of available space in the virtual volume than the amount of available space the matching plurality of entries made to the control data set use therein. A high number of entries made in the control data set which parallel the high number of small data sets allocated to the virtual volume may cause the control data set to become nearly filled. Thus, large data sets may preferably be allocated to such virtual volumes having a high number of small data sets allocated thereto, to take advantage of the free space in the virtual volume while also minimizing the number of entries made to the control data set.

On the other hand, a virtual volume having a high number of large data sets allocated thereto may have very little free space therein while the control data set corresponding to the virtual volume may have a higher amount of free space in view of the relatively low number of entries made thereto. Thus small data sets may preferably be allocated to this virtual volume to take advantage of the free space in the control data set while also minimizing the amount of data added to the virtual volume to avoid it becoming filled while the control data set still has available free space.

Rather than having to examine each of the virtual volumes and/or control data sets every time a data set allocation is performed, the first and second indexes provide an updated order in which the virtual volumes and/or control data sets are preferably used to perform allocations of large and small data sets, respectively. Thus, a virtual volume having the greatest amount of free space available as well as a control data set having the least amount of free space would preferably be listed at the primary position (most desirable) of the first index, and would thereby be considered first to perform an allocation of a large data set. Moreover, a virtual volume having the least amount of free space available as well as a control data set having the greatest amount of free space may be listed at the primary position (most desirable) of the second index, and would thereby be considered first to perform an allocation of a small data set.

According to some embodiments, the first and second key values may be stored in the first and second indexes respectively as hash table entries. For example, each of the first and second key values may represent a position value of the associated virtual volume and control data set with respect to the other virtual volumes and control data sets.

Moreover, when a virtual volume and/or control data set becomes full, is filled beyond a given percentage, has a certain capacity remaining, etc., the first and second key values associated therewith are preferably minimized (e.g., set to zero), thereby dropping them to the bottom of the first and second indexes, respectively. Because a data set allocation may not be able to be successfully performed to a virtual volume and/or control data set which is full or filled beyond a certain extent, minimizing the first and second key values may desirably improve efficiency and reduce computing load by preventing unnecessary data allocation failures. In other approaches, virtual volume and control data set may simply be removed from the first and second indexes in response to the virtual volume and/or control data set becoming full or filled to a certain extent. However, when space is made available again on the virtual volume and/or control data set which was previously full or filled, the first and second key values are preferably updated to reflect the change in the amount of free space therein. Thus, a virtual volume and control data set previously removed from the first and second indexes, respectively, may be returned to the first and second indexes in response to an amount of space therein becoming available (e.g., freed).

With continued reference to FIG. 4A, operation 412 includes receiving a data set allocation request, e.g., from a user, in response to an event occurring, periodically, etc. Moreover, decision 414 includes determining whether the size of the data set received in operation 412 is greater than a threshold (e.g., a break point). With reference to the present description, a "threshold" or "break point" may be used to determine whether a given data set qualifies as a small data set or a large data set. Thus, if the size of a data set (e.g., the amount of data) is greater than the threshold (e.g., break point), the data set may be characterized as being a large data set. However, if the size of a data set (e.g., the amount of data) is less than or equal to the threshold (e.g., break point), the data set may be characterized as being a small data set. It should be noted that "greater than a threshold" is in no way intended to limit the invention. Rather than determining whether a value is greater than a threshold (e.g., break point), equivalent determinations may be made, e.g., as to whether a value is within a predetermined range, whether a value is outside a predetermined range, whether an absolute value is above a threshold, whether a value is below a threshold, etc., depending on the desired approach.

In different embodiments, the threshold may be permanently set, periodically updated, calculated in real time, adjusted upon request, etc., by a user, an implemented algorithm, by a controller according to any of the approaches described herein, etc. Thus, according to an exemplary embodiment, a static threshold of 100 cylinders (e.g., tracks of a disk) may be implemented, but may be higher or lower. According to another embodiment, a threshold may be adjusted dynamically based on the size of the data sets associated with allocations performed over time. For instance, if a certain number of allocations corresponding to data sets below the threshold (small data sets) are performed in a given amount of time, in a row, out of a total number of allocations, etc., the threshold may be lowered, e.g., to account for an influx if smaller data sets. Similarly, if a certain number of allocations corresponding to data sets above the threshold (large data sets) are performed in a given amount of time, in a row, out of a total number of allocations, etc., the threshold may be increased, e.g., to account for an influx if smaller data sets. According to another approach, each of the storage groups may have a unique threshold which may be the same or different than each of the other thresholds, e.g., depending on various information pertaining to the given storage group.

Moreover, it should be noted that in some embodiments, additional thresholds may be implemented. According to an example, which is in no way intended to limit the invention, a second threshold may be implemented such that the first threshold may be used to distinguish between large and medium sized data sets, and the second threshold may be used to distinguish between small and medium sized data sets. Additional thresholds may be desirable when allocating data sets having a wide range of sizes (e.g., to more effectively characterize the relative size of the data sets), when free space in virtual volumes and/or control data sets is limited, etc.

As previously mentioned, collected information may be used differently depending on the size of the data set being allocated. Referring still to FIG. 4A, method 400 proceeds to operation 416 in response to determining that the size of the data set is greater than the threshold. As shown, operation 416 includes using the first key values in the first index to select a virtual volume and corresponding control data set. As mentioned above, the first key values and first index may be used to determine a preferred order in which the various virtual volumes may be used to perform an allocation of a large data set based on information which corresponds to the status of the virtual volumes and/or corresponding control data sets.

Returning to decision 414, method 400 proceeds to operation 418 in response to determining that the size of the data set received in operation 412 is less than the threshold. Operation 418 includes using the second key values in the second index to select a virtual volume and corresponding control data set.

Looking now to FIG. 4B, operation 420 includes performing the allocation request in the virtual volume selected in either operation 416 or operation 418 of FIG. 4A, e.g., depending on the data set. Method 400 may also cause storage of control data about the data set to be stored in the control data set corresponding to the selected virtual volume. See operation 422.

Method 400 additionally includes updating the first and second key values associated with the selected virtual volume and corresponding control data set used to perform the allocation request. See operation 424. After data has been added to the virtual volume and a corresponding entry has been made to the control data set, the amount of free space included in the virtual volume and control data set changes. Thus, the first and second key values are preferably updated to account for the change in free space. Although method 400 includes the first and second key values being updated after every data set allocation which is performed, in other embodiments the first and/or second key values may be updated after a certain number of data set allocations have been performed, when a predetermined amount of bandwidth is available (e.g., during low throughput), after an amount of time has passed, in response to a request, in response to a predetermined condition being met, etc., depending on the desired embodiment.

The first and/or second indexes may also be adjusted in response to the first and second key values being updated. According to one approach, the first and/or second index may be adjusted when the statistics have changed such that the volume and/or control data set is no longer in the correct index location relative to the first and/or second key values of the other volumes and/or control data sets. A key value may be updated by sorting the table and swapping the key values so that the table continues to be in the correct order. However, the first and/or second index may not be updated after every allocation is performed, e.g., in response to user request. Alternatively, the first and/or second index may be updated after a predetermined number of allocation requests have been performed, after an amount of time has passed, upon request, etc. By reducing the frequency by which the first and/or second index is updated, the resulting overhead may desirably be reduced.

In the event that an allocation request fails as a result of stale (e.g., not updated) data in the first and/or second index, subsequent entries in the first and/or second index are preferably used in an attempt to perform the allocation request. Furthermore, the first and/or second indexes are preferably updated after the allocation is successfully performed in order to overcome any discrepancies in the indexes and avoid any additional failed allocation requests. This may be performed in response to collecting information pertaining to the storage system in which the virtual volumes and/or control data sets are included, e.g., by performing a macro call.

It follows that some of the embodiments described herein are able to efficiently separate volume allocation requests and availability into different classes in the data storage context. The separation is preferably determined based on the size of the data set corresponding to the allocation request, but additional factors may also be examined, e.g., depending on the type of medium.

Determining where to perform the data set allocation may include evaluating the amount of free space in each of the virtual volumes, the fragmentation value therein (e.g., based on the size of the data set), the amount of free space in the control data set corresponding to a virtual volume, etc., as well as other volume characteristics which may also be evaluated, e.g., depending on whether other space considerations are preferred. As a result, various embodiments described herein are able to overcome the inefficient use of memory experienced in previous implementations. Moreover, in doing so, the various embodiments described herein desirably improve efficiency of storage use, increase data storage density, reduce the number of allocation failures, reduce the amount of available yet unusable data storage space, etc.

Any one or more of the approaches described herein may be implemented in data storage systems of varying size and/or type. For example, in some approaches method 400 may be performed for an enterprise type storage system having a number of hard disk storage drives divided into a plurality of virtual volumes and corresponding control data sets. However, in other approaches, one or more of the processes described above for method 400 may be scaled down to be applied to a single data storage drive divided into several virtual volumes and corresponding control data sets.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product comprising a computer readable storage medium having program instructions embodied therewith, the program instructions executable by a computer to cause the computer to:

receive, by the computer, a data set allocation request;

determine, by the computer, whether a size of the data set is greater than a threshold;

use, by the computer, first key values in a first index to select a volume from a plurality of volumes in response to determining that the size of the data set is greater than the threshold;

use, by the computer, second key values in a second index to select a volume from the plurality of volumes in response to determining that the size of the data set is less than the threshold;

perform, by the computer, the allocation request in the selected volume; and store, by the computer, control data about the data set in a control data set corresponding to the selected volume, wherein first and second key values are generated for the plurality of volumes and corresponding control data sets, respectively.

2. The computer program product of claim 1, the program instructions executable by the computer to cause the computer to:

collect, by the computer, information, wherein the collected information includes an amount of free space in each of more than one-volume, and an amount of free space in each of more than one control data set which correspond to the volumes.

3. The computer program product of claim 2, wherein the information is collected from a macro call.

4. The computer program product of claim 2, wherein the collected information includes a fragmentation level in each of the volumes.

5. The computer program product of claim 2,
wherein the collected information is used to generate the first and second key values.

6. The computer program product of claim 5, wherein a greater amount of free space in the volume and a lesser amount of free space in the control data set correspond to a higher first key value, wherein a lesser amount of free space in the volume and a greater amount of free space in the control data set correspond to a higher second key value.

7. The computer program product of claim 5, wherein the first key value is determined for a given volume and corresponding control data set by assigning a weight of greater than 50% to the amount of free space in the volume, and a weight of less than 50% to the amount of free space in the control data set, wherein the second key value is determined for a given volume and corresponding control data set by assigning a weight of less than 50% to the amount of free space in the volume, and a weight of greater than 50% to the amount of free space in the control data set.

8. The computer program product of claim 5, the program instructions executable by the computer to cause the computer to:

use, by the computer, the first key values to index the volumes and corresponding control data sets in the first index; and use, by the computer, the second key values to index the volumes and corresponding control data sets in the second index.

9. The computer program product of claim 1, the program instructions executable by the computer to cause the computer to:

update, by the computer, the first and second key values of the selected volume and corresponding control data set used to perform the allocation request.

10. The computer program product of claim 1, wherein the first and second key values are generated using an amount of free space in each of the plurality of volumes, and an amount of free space in each of the control data sets which correspond to the volumes.

11. A computer-implemented method, comprising:
receiving a data set allocation request;
determining whether a size of the data set is greater than a threshold;
using first key values in a first index to select a volume from a plurality of volumes in response to determining that the size of the data set is greater than the threshold;
using second key values in a second index to select a volume from the plurality of volumes in response to determining that the size of the data set is less than the threshold;
performing the allocation request in the selected volume; and
storing control data about the data set in a control data set corresponding to the selected volume,
wherein first and second key values are generated for the plurality of volumes and corresponding control data sets, respectively.

12. The computer-implemented method of claim 11, comprising:
collecting information, wherein the collected information includes an amount of free space in each of more than one volumes, and an amount of free space in each of more than one control data sets which correspond to the volumes.

13. The computer-implemented method of claim 12, wherein the collected information includes a fragmentation level in each of the volumes.

14. The computer-implemented method of claim 12,
wherein the collected information is used to generate the first and second key values.

15. The computer-implemented method of claim 14, wherein a greater amount of free space in the volume and a lesser amount of free space in the control data set correspond to a higher first key value, wherein a lesser amount of free space in the volume and a greater amount of free space in the control data set correspond to a higher second key value.

16. The computer-implemented method of claim 14, wherein the first key value is determined for a given volume and corresponding control data set by assigning a weight of greater than 50% to the amount of free space in the volume, and a weight of less than 50% to the amount of free space in the control data set, wherein the second key value is determined for a given volume and corresponding control data set by assigning a weight of less than 50% to the amount of free space in the volume, and a weight of greater than 50% to the amount of free space in the control data set.

17. The computer-implemented method of claim 14, comprising:
using the first key values to index the volumes and corresponding control data sets in the first index; and
using the second key values to index the volumes and corresponding control data sets in the second index.

18. The computer-implemented method of claim 11, comprising:
updating the first and second key values of the selected volume and corresponding control data set used to perform the allocation request.

19. The computer-implemented method of claim 11, wherein the first index provides an order in which a plurality of volumes are used to perform a given data set allocation request having a size that is greater than the threshold, wherein the second index provides an order in which the plurality of volumes are used to perform a given data set allocation request having a size that is less than the threshold.

20. A system, comprising:
a processor and logic integrated with and/or executable by the processor, the logic being configured to:
collect information, wherein the collected information includes an amount of free space in each of more than one volume, an amount of free space in each of more than one control data set which correspond to the volumes, and a fragmentation level in each of the volumes;
use the collected information to generate a first key value and a second key value for each of the volumes and corresponding control data sets;
use the first key values to index the volumes and corresponding control data sets in a first index;
use the second key values to index the volumes and corresponding control data sets in a second index;
receive a data set allocation request;
determine whether a size of the data set is greater than a threshold;
use the first key values in the first index to select a volume in response to determining that the size of the data set is greater than the threshold;
use the second key values in the second index to select a volume in response to determining that the size of the data set is less than the threshold;
perform the allocation request in the selected volume;
cause storage of control data about the data set in the control data set corresponding to the selected volume; and
update the key values of the selected volume and corresponding control data set used to perform the allocation request.

* * * * *